(12) United States Patent
Martello

(10) Patent No.: US 6,802,480 B1
(45) Date of Patent: Oct. 12, 2004

(54) CABLE CLIP

(76) Inventor: Gilbert A. Martello, 2900 Rockefeller Rd., Willoughby Hills, OH (US) 44092

( * ) Notice: Subject to any disclaimer, the term of this patent is extended or adjusted under 35 U.S.C. 154(b) by 0 days.

(21) Appl. No.: 10/420,135

(22) Filed: Apr. 23, 2003

Related U.S. Application Data

(60) Provisional application No. 60/383,315, filed on May 24, 2002.

(51) Int. Cl.[7] .............................. F16L 3/00; F16L 3/08
(52) U.S. Cl. ......................... 248/63; 248/74.3; 24/373
(58) Field of Search .......................... 24/370, 373, 375, 24/598.2, 601.7, 601.8, 601.9, 115 F; 16/87.2; D8/394, 395, 396, 356; D11/121; 248/61, 62, 839, 316.7, 301, 305, 306, 340; 174/32, 41, 146

(56) References Cited

U.S. PATENT DOCUMENTS

| | | | | |
|---|---|---|---|---|
| 313,305 A | * | 3/1885 | Eckert | |
| 2,229,129 A | * | 1/1941 | Riegelman | |
| 2,260,584 A | * | 10/1941 | Shuck et al. | 5/94 |
| 2,884,478 A | * | 4/1959 | Becker | |
| 4,909,466 A | * | 3/1990 | Matthews | 248/303 |
| 5,344,107 A | * | 9/1994 | Lee | 248/60 |
| 5,803,422 A | * | 9/1998 | Buehler | 248/339 |
| D402,536 S | * | 12/1998 | Cousins | D8/354 |
| 6,059,241 A | * | 5/2000 | Martone | 248/230.1 |
| 6,367,118 B1 | * | 4/2002 | Berfield | 15/323 |

FOREIGN PATENT DOCUMENTS

FR            2598884 A1 * 11/1987 .......... A01K/61/00

* cited by examiner

Primary Examiner—Gwendolyn Baxter
(74) Attorney, Agent, or Firm—Renner, Kenner, Greive, Bobak, Taylor & Weber

(57) ABSTRACT

A cable clip including a hook portion and a loop portion, where the hook portion has a mouth that is expandable to receive an object on which the clip is to be hung. The loop portion, which is carried on the hook portion and supported on the object thereby, defines a bore adapted to receive at least one cable therein.

15 Claims, 2 Drawing Sheets

CABLE CLIP

This application claims benefit to the U.S. Provisional Application 60/383,315 filed on May 24, 2002.

TECHNICAL FIELD

In general, the present invention relates to a device for hanging or organizing cables. More particularly, the present invention relates to a cable clip that is fastened to a stationary object and defines a loop in which the cables are received. Most particularly, the present invention relates to a cable clip having a flexible body adapted to snap onto a rail or other similar structure, having a loop that is flexed open to selectively receive and release cables therein.

BACKGROUND ART

Cables, cords, wires, ropes and other elongate flexible items, which for purposes of this invention will be collectively referred to as "cables," are often underfoot or prone to entanglement with other objects, people and each other. For example, in boating, numerous cables including electrical cables and rope are present on the boat and it is desirable to neatly store these cables out of the way, to protect the cables and the boat's passengers from entanglement.

SUMMARY OF THE INVENTION

It is, therefore, an object of the present invention to provide a cable clip to organize cables.

It is another object of the present invention to provide a cable clip that fastens cables to an object.

In light of at least one of the foregoing objects, the present invention provides a cable clip that includes a hook portion and a loop portion, the hook portion having a mouth that is expandable to receive an object into the hook portion. The loop portion, which is supported on the object by the hook portion, defines a bore adapted to receive at least one cable therein. In this way, the cable is fastened to the object.

The present invention further provides a cable clip having a hook portion and a loop portion, wherein the hook portion and loop portion define bores that lie along spaced axes that are parallel to each other. The hook portion defines a mouth that is expandable to receive an object to which the cables are to be fastened. The loop portion has a flexible tab portion extending toward the hook portion. The tab portion is flexible away from the hook portion to open the loop portion for receipt of a cable within the loop portion bore.

The present invention further provides a cable clip made according to a method that includes the steps of providing a die that defines a hook portion and a loop portion, respectively, having a first bore and second bore formed along spaced parallel axes. Material is extruded through the die to form clip stock, and cut along a plane perpendicular to the axes.

The present invention further provides a cable clip for attaching a cable to an object. The cable clip includes a catch assembly attachable to the object, and a loop portion supported on the catch assembly. The loop portion defines a bore through which the cable is received.

DETAILED DESCRIPTION OF THE INVENTION

Figure 1:
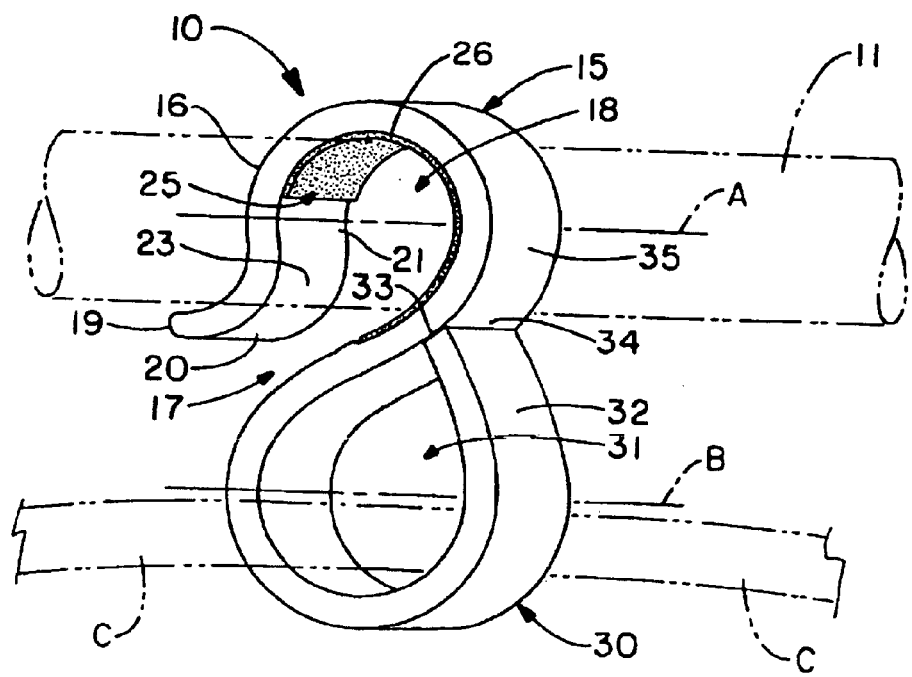
FIG. 1 is a perspective view of a cable clip according to the concepts of the present invention with a rail and cable shown in chain lines for environmental purposes.
Figure 2:
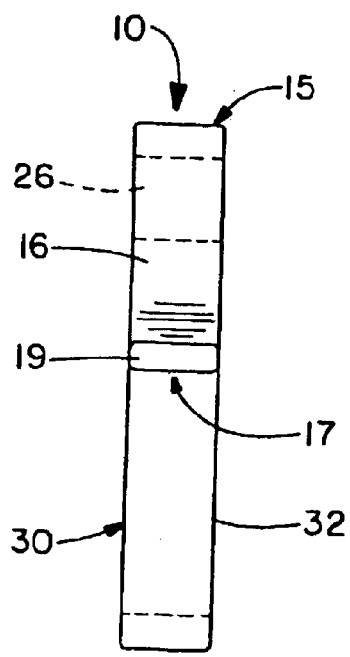
FIG. 2 is a left side elevational view of the cable clip depicted in FIG. 1.
Figure 3:
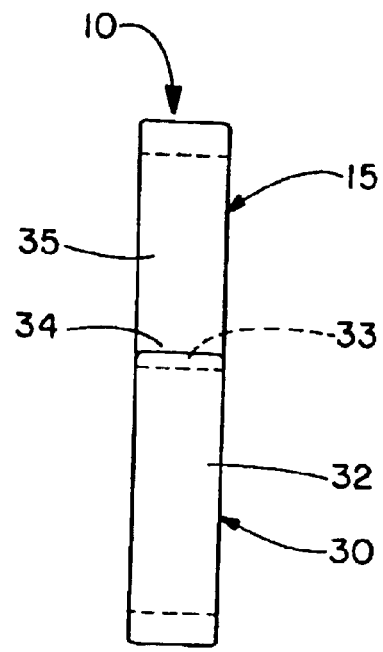
FIG. 3 is a right side elevational view of the cable clip depicted in FIG. 1.

A cable clip, generally indicated by the numeral 10 in the accompanying Figures, is designed to organize as by hanging or otherwise fastening cables C to a selected object 11. For purposes of illustration only, continued reference will be made to the example of a cable C located on a boat. In this example, one convenient object 11 for attachment is a railing or similar tubular member on the boat.

To secure cable C to object 11, cable clip 10 is adapted to attach to the object 11. For example, cable clip 10 may be provided with a catch assembly, generally indicated by the numeral 15, that attaches the cable clip 10 to the stationary object 11. In the example shown, catch assembly 15 includes a hook portion 16 that may be sized to fit over the object 11. As will be appreciated, hook portion 16 may vary in size and shape to accommodate various objects 11. In general, hook portion 16 includes at least one member that may hang from or grasp the object 11. Hook portion 16 may be made flexible and include a mouth, indicated at 17, sized smaller than the object 11, leading into a first bore 18 sized to substantially conform to the stationary object 11. In this example, the hook portion 16 must flex outwardly at mouth 17 to receive the object 11. Once the object 11 is within first bore 18, the hook portion 16 may retract, trapping the object 11 within first bore 18.

As shown, the hook portion 16 may be attached to the stationary object 11 by snapping the hook portion 16 onto the stationary object 11. By applying pressure to the hook portion 16, the object 11 forces the flexible hook portion 16 to expand, at 17, allowing the object 11 to enter the first bore 18. To facilitate this, the hook portion 16 may be provided with a bill portion 19 that extends outwardly from the hook portion 16 in a generally lateral sense to provide a bearing surface 20 adapted to engage the object 11 and provide leverage for flexing the hook portion 16 outward to broaden the mouth 17 allowing the object 11 to pass into first bore 18. As mentioned, the first bore 18 may be contoured to fit the particular object 11, and, in the example shown, hook portion 16 is made arcuate having a generally semi-circular interior surface 21 for receipt of a circular cross-sectioned object 11, such as a rail on a boat. It will be appreciated, however, that bore 18 may have virtually any shape.

It may be desirable to prevent any sliding of the cable clip 10 relative to the object 11 on which the cable clip 10 is attached. For example, in boating, the motion of the boat may cause the clip 10 to slide along the rail's length. To that end, a material having a higher coefficient of friction than the interior surface 21 of hook portion 16, generally referred to as a higher friction material and indicated by the numeral 25, may be carried on the interior surface 21 of hook portion 16 to cause the hook portion 16 to grip the surface of the object 11. It will be appreciated that a variety of higher friction materials 25 may be used including elastomeric polymers, rubber, and foam. These materials may be coated on the hook portion 16 or, as shown in the embodiment depicted in FIG. 1, a ply or pad 26 of high friction material may be attached to the interior surface 21 of the hook portion 16. To facilitate attachment of the hook portion 16 to the object 11, the jaw portion, generally indicated at 23, of the cable clip 10, which generally forms the outer wall of the mouth 17, may be left free of high friction material 25 to allow the object 11 to initially slide easily into the first bore 18.

To hang a cable C on an object 11, cable clip 10 is provided with a loop portion, generally indicated by the numeral 30, adapted to selectively receive and carry the cable C therein. To that end, loop portion 30 defines a second bore, generally indicated at 31, in which the cable C is received. It will be appreciated that, like hook portion 16, the loop portion 30 and second bore 31 may have any cross-sectional shape that is capable of receiving and supporting a cable C therein including geometric forms and hook forms. In the example shown, loop portion 30 is a substantially closed structure having an end that selectively abuts the hook portion 16 to form a closed second bore 31 (FIG. 1). When hook-like forms are used, loop portion 30 may resemble hook portion 16 and have an open mouth at its upper portion for hanging a cable C within the second bore 31. The loop portion 30 may also be a closed form. In this instance, cable C would be threaded through the opening 31 in an axial direction.

Figure 4:
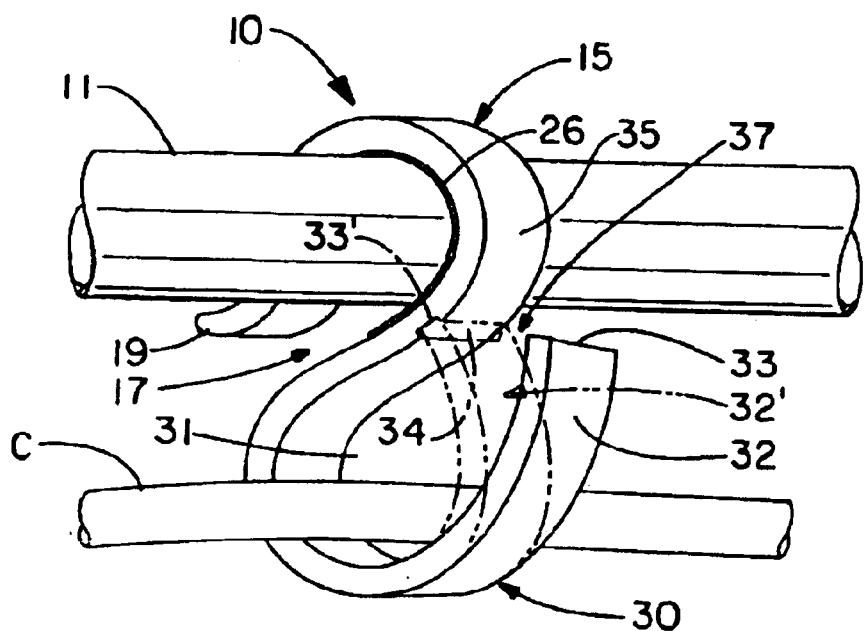
FIG. 4 is a perspective view similar to FIG. 1, illustrating flexing of a portion of the clip to allow insertion of cables into a bore formed in the cable clip.
Figure 5:
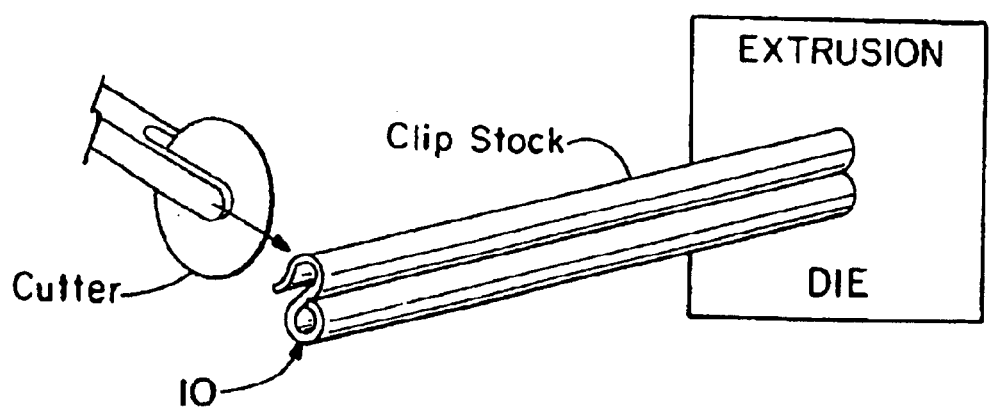
FIG. 5 schematically illustrates one process for manufacturing a cable clip according to the present invention.

Like the hook portion 16, the loop portion 30 may be formed of a flexible material such that a tab portion 32 may be displaced to allow the cable C to be inserted between the end 33 of tab portion 32 and an adjacent surface 34, which as shown may be the outer surface of hook portion 16 of the cable clip 10. For example, tab portion 32 may be pulled outward to create an opening for the passage of the cable C, or the tab portion 32 may be pressed radially inward, as, for example, with cable C, to create sufficient clearance for the cable C to enter the loop portion 30. In the embodiment shown, the cable clip 10 is configured in a substantially double loop or S-loop configuration such that the hook portion 16 forms a first loop, and the loop portion 30 forms a second loop, respectively, having parallel axes A and B, where starting with the hook portion 16, the band of material forming the hook portion 16 proceeds downwardly and doubles back upon itself to form the loop portion 30. As shown, the hook portion 16 may extend forwardly as it transitions into loop portion 30 such that the loop portion 30 extends below hook portion 16. In this way, the cable C is positioned below the object 11, which may be advantageous in keeping the cable C concealed or out of the way. It will be appreciated that the loop portion 30 may be extended in other directions to obtain other desirable positions for cable C. Forming the cable clip 10 of a single band of material facilitates manufacture of the cable clip 10 by lower cost methods, such as, extrusions (FIG. 5). In this example, the exterior surface 35 of the hook portion 16 faces the end 33 of the tab portion 32 to close the loop 30. As best shown in FIG. 4, the tab portion 32 is pulled away from the external surface 35 of hook portion 16 to provide an opening, indicated at 37, through which the cable C is radially received. Thus, it can be seen that loop portion 30 has a generally closed condition (FIG. 1) where the end 33 of tab portion 32 is located adjacent the hook portion 16 closing the second bore 31 of the loop portion 16 to trap a cable C therein, and an open condition, shown in solid lines in FIG. 4, where the tab portion 32 is flexed outwardly from the hook portion 16 to open the loop 31 for receipt of the cable C.

To create an interlocking engagement of the end 33 of the loop portion 30, a recess 34 may be formed in the hook portion 16 opposite the end 33 of tab portion 32 such that the end 33 is partially received within the hook portion 16. As best shown in FIG. 4, the tab portion 32, shown in an open condition, may be displaced inwardly, at 32', to place the end 33 within recess 34 in a closed condition, generally indicated at 33'. To facilitate retention of the end 33 within recess 34, the end 33 may be slightly larger than the recess 34 to assure an interference or snap fit between the recess 34 and end 33.

Cable clip 10 may be constructed of any number of materials including wood products, metals, plastics, ceramics and combinations thereof. In the example shown, the cable clip 10 is constructed of a polyvinyl chloride (PVC) polymer. In this example, the cable clip 10 is manufactured through an extrusion process, illustrated in FIG. 5. As shown, a dual durometer extrusion process may be used to form an elongated piece of cable clip stock, which may be cut along a plane perpendicular to the axes A and B to form individual cable clips 10. The high friction material 25 may be applied or attached during the extrusion process, or at a later time. It will be appreciated that this process is but one example of a suitable manufacturing method for constructing the cable clip 10 with other manufacturing methods being readily apparent to those of ordinary skill in the art.

In light of the foregoing, it should thus be evident that the process of the present invention, providing a cable clip, substantially improves the art. While, in accordance with the patent statutes, only the preferred embodiments of the present invention have been described in detail hereinabove, the present invention is not to be limited thereto or thereby.

What is claimed is:

1. A cable clip comprising:
   a hook portion and a loop portion, said hook portion defining a first bore having a mouth that opens radially outward of said hook portion, where said first bore is adapted to receive an object therein; said loop portion being supported on said hook portion, wherein said loop portion defines a second bore adapted to receive at least one cable therein wherein said loop portion includes an end that abuts said hook portion to create a closed second bore, said end being deflectable for radial insertion of the at least one cable within said second bore of said loop portion; and wherein said hook portion defines a recess adapted to receive said end therein.

2. The cable clip of claim 1, wherein said end is sized slightly larger than said recess to create an interference fit therebetween.

3. The cable clip of claim 1, wherein said hook portion and loop portion are integrally formed from a single band of material.

4. The cable clip of claim 1, wherein said hook portion is flexible.

5. The cable clip of claim 4, wherein said mouth is smaller than said first bore.

6. The cable clip of claim 5 further comprising a bill portion extending outward from said hook portion adjacent said mouth.

7. The cable clip of claim 6, wherein said hook portion includes a jaw portion adjacent said bill portion, said jaw portion forming an outer wall of said mouth wherein a portion of an inner surface of said hook portion carries a higher friction material, said jaw portion and said bill portion being free of said higher friction material.

8. The cable clip of claim 7, wherein said higher friction material is in the form of a pad attached to said inner surface.

9. The cable clip of claim 1, further comprising a higher friction material applied to at least a portion of an inner surface of said hook portion.

10. The cable clip of claim 9, wherein said higher friction material is in the form of a pad attached to said inner surface.

11. A cable clip comprising a hook portion and a loop portion, wherein said hook portion and loop portion respectively define a first bore and a second bore that lie along spaced axes, said hook portion defining a mouth opening into said first bore to receive an object within said first bore of said hook portion; said loop portion having a flexible tab portion extending toward said hook portion that is adapted to flex outwardly from said hook portion to provide for insertion of a cable within the second bore, wherein said hook portion and said loop portion are formed integrally, said hook portion having a substantially semicircular shape transcending into a substantially circular loop portion having an end that abuts an exterior surface of said hook portion, wherein said hook portion defines a recess for receipt of said end of said loop portion.

12. The cable clip of claim 11, wherein said loop portion extends downwardly and forwardly of said hook portion.

13. The cable clip of claim 12, wherein said loop portion includes a tab portion that terminates in an end, said end abutting an adjacent surface of the cable clip to form a closed second bore.

14. The cable clip of claim 13, wherein said adjacent surface is an outer surface of said hook portion.

15. The cable clip of claim 11, wherein said axes run parallel to each other.

* * * * *